United States Patent
Lee et al.

(10) Patent No.: US 8,605,173 B2
(45) Date of Patent: Dec. 10, 2013

(54) DIFFERENTIAL COLUMN ADC ARCHITECTURES FOR CMOS IMAGE SENSOR APPLICATIONS

(75) Inventors: Sang-Soo Lee, Cupertino, CA (US); Yibing Michelle Wang, Temple City, CA (US); Jeffrey Joseph Rysinski, Pasadena, CA (US)

(73) Assignee: SK hynix Inc., Icheon-si (KR)

( * ) Notice: Subject to any disclaimer, the term of this patent is extended or adjusted under 35 U.S.C. 154(b) by 632 days.

(21) Appl. No.: 12/857,386

(22) Filed: Aug. 16, 2010

(65) Prior Publication Data

US 2012/0038809 A1    Feb. 16, 2012

(51) Int. Cl.
*H04N 5/217* (2011.01)
*H04N 5/76* (2006.01)

(52) U.S. Cl.
USPC ........................................ 348/241; 348/231.6

(58) Field of Classification Search
USPC ............... 348/231.6, 241; 341/128, 129, 132, 341/133, 155, 161, 169, 164, 165
See application file for complete search history.

(56) References Cited

U.S. PATENT DOCUMENTS

| | | | | |
|---|---|---|---|---|
| 7,218,260 | B2 * | 5/2007 | Lim | 341/122 |
| 7,471,231 | B2 | 12/2008 | Ang et al. | |
| 2006/0280092 | A1 * | 12/2006 | Tonami | 369/59.21 |
| 2008/0094494 | A1 * | 4/2008 | Lee et al. | 348/294 |
| 2010/0315540 | A1 * | 12/2010 | Hoshino | 348/294 |

FOREIGN PATENT DOCUMENTS

| | | |
|---|---|---|
| KR | 100720304 B1 | 5/2007 |
| KR | 100746197 B1 | 7/2007 |
| KR | 1020100004800 A | 1/2010 |

* cited by examiner

*Primary Examiner* — Lin Ye
*Assistant Examiner* — Euel Cowan
(74) *Attorney, Agent, or Firm* — Kilpatrick Townsend & Stockton LLP

(57) ABSTRACT

Circuits, methods, and apparatus that provide differential-input, single-slope, column-parallel analog-to-digital converter (ADC) architectures for use in high-resolution CMOS image sensors (CIS) are described. A column ADC is coupled with a column of a pixel array and configured to convert a pixel signal level to a corresponding digital output value according to a ramp generator output. Each pixel is configured to output a pixel reset level and a pixel signal level at different operating stages, and the ramp generator output includes a ramp reset level and a ramp signal level at the same or different operating stages. The pixel and ramp outputs are used to differentially drive a comparator stage of the column ADC, for example, to reduce power supply noise.

19 Claims, 12 Drawing Sheets

DIFFERENTIAL COLUMN ADC ARCHITECTURES FOR CMOS IMAGE SENSOR APPLICATIONS

BACKGROUND

Embodiments relate to image sensors in general and, in particular, to novel architectures for single-slope column-parallel analog-to-digital converters (ADCs).

Proliferation of complementary metal-oxide-semiconductor (CMOS) image sensors (CIS) in consumer markets has been accelerated by the adoption of CIS in many popular consumer electronics applications, including mobile handsets. This trend, together with the rapid growth in smartphone markets, has led manufacturers and consumers to desire apparently ever-increasing resolutions in their CIS applications. In this context, CIS designers have remained constrained by issues relating to die sizes and aspect ratios, costs, power consumption, and others.

As sensor resolution increases, operation of the sensors in desired frame rates (e.g., full HD frame rate) involves higher data conversion rates. Many typical applications of high resolution sensors employ single-slope column-parallel analog-to-digital converters (ADCs) at least to achieve these higher data conversion rates while dissipating low power. For example, in comparison to competing architectures, like global serial pipeline ADC architectures, the column-parallel ADC architecture can achieve lower read noise, and thus higher dynamic range, due to reduced bandwidth readout circuit for each column's ADC.

Typical CIS Applications tend to experience both row-wise and column-wise noise from various sources. For example, some row-wise noise may result from power supply movement, and some column-wise noise, for example, including column fixed-pattern noise (CFPN), may result from variations in column circuits. The various types of noise can cause undesirable effects, including limitations on the sensitivity of the CIS, visible artifacts in the CIS output, etc. Thus, it may be desirable to provide techniques for addressing these row-wise and/or column-wise noise sources.

SUMMARY

Among other things, circuits, methods, and apparatus are described that provide differential input, single-slope, column-parallel analog-to-digital converter (ADC) architectures for use in high resolution CMOS image sensors (CIS). A column ADC is coupled with a column of a pixel array and configured to convert a pixel signal level to a corresponding digital output value according to a ramp generator output. Each pixel is configured to output a pixel reset level and a pixel signal level at different operating stages, and the ramp generator output includes a ramp reset level and a ramp signal level at the same or different operating stages. The pixel and ramp outputs are used to differentially drive a comparator stage of the column ADC, for example, to reduce power supply noise.

In some embodiments, the pixel reset level and the ramp reset level are coupled with a first differential input of the comparator stage of the column ADC, while the pixel signal level and the ramp signal level are coupled with a second differential input of the comparator stage. In other embodiments, the pixel output (i.e., the pixel reset level or the pixel signal level) is coupled with the first differential input of the comparator stage, while the ramp output (i.e., the ramp reset level or the ramp signal level) is coupled with the second differential input of the comparator stage. Certain embodiments include additional functionality, such as analog binning, additional comparator stages, color filter handling, peripheral circuitry, etc.

In one set of embodiments, an image processing system is provided. The system includes a column analog-to-digital converter (ADC), electrically coupled with a pixel of an image sensor array, having a gain stage, a differential sampling subsystem, and a crossover detection subsystem. The gain stage includes a first differential input node and a second differential input node, and is configured to operate in an auto-zero mode or a non-auto-zero mode. The differential sampling subsystem is electrically coupled with the gain stage and configured to: sample a pixel reset level at the first differential input node during a first operating state, the pixel reset level received from the pixel of the image sensor array; sample a pixel signal level at the second differential input node during a second operating state subsequent to the first operating state, the pixel signal level received from the pixel of the image sensor array; sample a ramp reset level at the first differential input node during a third operating state subsequent to the second operating state; and sample a ramp signal level at the second differential input node of the gain stage during the third operating state, the ramp signal level received from a ramp generator and changing over time according to a slope. The crossover detection subsystem is electrically coupled with the differential sampling subsystem and configured to: detect a crossover time at which at least one output of the gain stage changes polarity during the third operating state as the ramp signal level at the second differential input node changes while the ramp reset level at the first differential input node stays at a substantially constant level; and output a digital code corresponding to the crossover time.

In another set of embodiments, a method is provided. The method includes sampling a pixel reset level at a first differential input node of a gain stage of a column analog-to-digital converter (ADC) during a first operating state of the ADC, the pixel reset level received from a pixel of an image sensor array; sampling a pixel signal level at a second differential input node of the gain stage during a second operating state of the ADC subsequent to the first operating state of the ADC, the pixel signal level received from the pixel of the image sensor array; sampling a ramp reset level at the first differential input node of the gain stage during a third operating state of the ADC subsequent to the second operating state of the ADC; sampling a ramp signal level at the second differential input node of the gain stage during the third operating state of the ADC, the ramp signal level received from a ramp generator and changing over time according to a slope; detecting a crossover time at which at least one output of the gain stage changes polarity during the third operating state as the ramp signal level at the second differential input node changes while the ramp reset level at the first differential input node stays at a substantially constant level; and outputting a digital code corresponding to the crossover time.

In yet another set of embodiments, another system is provided. The system includes means for sampling a pixel reset level at a first differential input node of a gain stage of a column analog-to-digital converter (ADC) during a first operating state of the ADC, the pixel reset level received from a pixel of an image sensor array; means for sampling a pixel signal level at a second differential input node of the gain stage during a second operating state of the ADC subsequent to the first operating state of the ADC, the pixel signal level received from the pixel of the image sensor array; means for sampling a ramp reset level at the first differential input node of the gain stage during a third operating state of the ADC subsequent to the second operating state of the ADC; means for sampling a ramp signal level at the second differential input node of the gain stage during the third operating state of the ADC, the ramp signal level received from a ramp generator and changing over time according to a slope; means for detecting a crossover time at which at least one output of the gain stage changes polarity during the third operating state as the ramp signal level at the second differential input node changes while the ramp reset level at the first differential input node stays at a substantially constant level; and means for outputting a digital code corresponding to the crossover time.

In still another set of embodiments, another image processing system is provided. The system includes a column analog-to-digital converter (ADC), electrically coupled with a pixel of an image sensor array, having: a gain stage, a differential sampling subsystem, and a crossover detection subsystem. The gain stage includes a first differential input node and a second differential input node, and is configured to operate in an auto-zero mode or a non-auto-zero mode. The differential sampling subsystem is electrically coupled with the gain stage and configured to: sample a pixel reset level at the first differential input node during a first operating state, the pixel reset level received from the pixel of the image sensor array; sample a ramp reset level at a second differential input node during the first operating state; sample a pixel signal level at the first differential input node during a second operating state subsequent to the first operating state, the pixel signal level received from the pixel of the image sensor array; and sample a ramp signal level at the second differential input node of the gain stage during the third operating state, the ramp signal level received from a ramp generator and changing over time according to a slope. The crossover detection subsystem is electrically coupled with the differential sampling subsystem and configured to: detect a crossover time at which at least one output of the gain stage changes polarity during the third operating state as the ramp signal level at the second differential input node changes while the pixel signal level at the first differential input node stays at a substantially constant level; and output a digital code corresponding to the crossover location.

In even another set of embodiments, a method is provided. The method includes sampling a pixel reset level at a first differential input node of a gain stage of a column analog-to-digital converter (ADC) during a first operating state of the ADC, the pixel reset level received from a pixel of an image sensor array; sampling a ramp reset level at a second differential input node of the gain stage during the first operating state of the ADC; sampling a pixel signal level at the first differential input node of the gain stage during a second operating state of the ADC subsequent to the first operating state of the ADC, the pixel signal level received from the pixel of the image sensor array; sampling a ramp signal level at the second differential input node of the gain stage during the third operating state of the ADC, the ramp signal level received from a ramp generator and changing over time according to a slope; detecting a crossover time at which at least one output of the gain stage changes polarity during the third operating state as the ramp signal level at the second differential input node changes while the pixel signal level at the first differential input node stays at a substantially constant level; and outputting a digital code corresponding to the crossover location.

And in another set of embodiments, another system is provided. The system includes means for sampling a pixel reset level at a first differential input node of a gain stage of a column analog-to-digital converter (ADC) during a first operating state of the ADC, the pixel reset level received from a pixel of an image sensor array; means for sampling a ramp reset level at a second differential input node of the gain stage during the first operating state of the ADC; means for sampling a pixel signal level at the first differential input node of the gain stage during a second operating state of the ADC subsequent to the first operating state of the ADC, the pixel signal level received from the pixel of the image sensor array; means for sampling a ramp signal level at the second differential input node of the gain stage during the third operating state of the ADC, the ramp signal level received from a ramp generator and changing over time according to a slope; means for detecting a crossover time at which at least one output of the gain stage changes polarity during the third operating state as the ramp signal level at the second differential input node changes while the pixel signal level at the first differential input node stays at a substantially constant level; and means for outputting a digital code corresponding to the crossover location.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

A further understanding of the nature and advantages of examples provided by the disclosure may be realized by reference to the remaining portions of the specification and the drawings wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

DETAILED DESCRIPTION

The following description provides exemplary embodiments only and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following imaging systems and methods may be components of a larger system, wherein other procedures may take precedence over or otherwise modify their application. Also, a number of steps may be required before, after, or concurrently with the following embodiments.

Proliferation of complementary metal-oxide-semiconductor (CMOS) image sensors (CIS) in consumer markets has been accelerated by the adoption of CIS in many popular consumer electronics applications, including mobile handsets. This trend, together with the rapid growth in smartphone markets, has led manufacturers and consumers to desire apparently ever-increasing resolutions in their CIS applications. In this context, CIS designers have remained constrained by issues relating to die sizes and aspect ratios, costs, power consumption, and others.

As sensor resolution increases, operation of the sensors in desired frame rates (e.g., full HD frame rate) involves higher data conversion rates. Many typical applications of high resolution sensors employ single-slope column-parallel analog-to-digital converters (ADCs) at least to achieve these higher data conversion rates while dissipating low power. For example, in comparison to competing architectures, like global serial pipeline ADC architectures, the column-parallel ADC architecture can achieve lower read noise, and thus higher dynamic range, due to reduced bandwidth readout circuit for each column's ADC.

Figure 1:
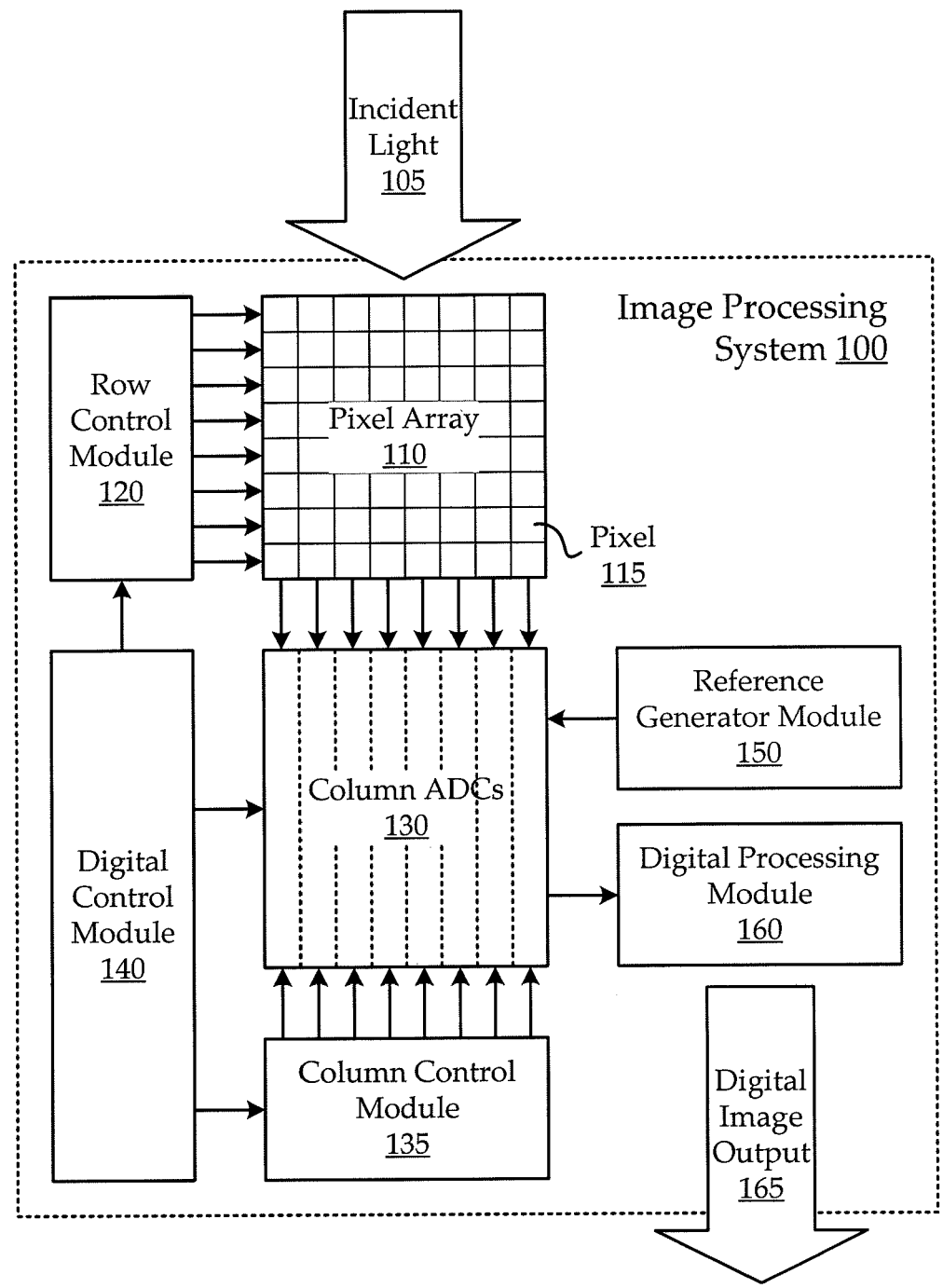
FIG. 1 shows a simplified functional block diagram of an illustrative image processing system, according to various embodiments.

Turning first to FIG. 1, a simplified functional block diagram is shown of an illustrative image processing system 100, according to various embodiments. The image processing system 100 includes a pixel array 110 configured to receive incident light 105 information and output a corresponding analog signal. The analog signal is converted into a digital representation by column ADCs 130 and passed to a digital processing module 160 for further processing in the digital domain. The digital processing module 160 outputs a digital image output 165, which is a digital representation of the incident light 105 exposed to the pixel array 110.

Generally, light interacts with each pixel 115 of the pixel array 110 as analog information. The pixels 115 are arranged in rows and columns, which effectively define the resolution of the pixel array 110 and affect the amount of incident light 105 information (e.g., light intensity data) that is converted by the image processing system 100 into digital image output 165 data. Various architectures for this type of conversion typically fall into two categories. According to one category, columnar data from each row of pixels 115 is selected and multiplexed, and the multiplexed data is converted into digital data using a serial ADC approach. According to another category, the columnar data is not multiplexed; instead, each row's data is converted column-wise into digital data by a column-parallel ADC process. FIG. 1 illustrates this second category.

Incident light 105 is detected at the pixel array 110 and converted into analog signals at each pixel 115. A row control module 120 selects each row, and the row passes its corresponding data (e.g., the analog signals from the row pixels 115) to a set of column ADCs 130. Each column ADC 130 processes one column of the row-wise data (i.e., one pixel 115) in parallel according to a column control module 135 to generate corresponding digital data for the row. The row control module 120 and the column control module 135 may be further controlled by a digital control module 140.

Different architectures are available within the column-parallel ADC approach for performing the analog-to-digital conversion. One such approach is known as "single-slope" ADC. According to single-slope ADC approaches, a reference signal, generated by a reference generator module 150, ramps with a certain slope and is compared to a pixel 115 signal level generated according to the incident light 105 intensity experienced by the corresponding pixel 115. The column ADC 130 detects a crossover point, at which the ramp signal crosses the pixel 115 signal level.

As described more fully below, this crossover point may be detected using analog techniques (e.g., comparators). The crossover point may then be converted to a digital value using digital techniques. For example, embodiments use counters to determine a digital code value corresponding to the crossover point.

The reference generator module 150 is typically coupled globally with all the column ADCs 130, so that the column ADCs 130 share a common reference signal. Notably, accuracy of the digital output may be affected by accurate detection of the crossover point, which may, in turn, be affected by movement in the reference level. For example, reference levels may change from pixel 115 to pixel 115 and/or may move according to movement (e.g., noise) in the power supply.

Because the reference signal is shared across the column ADCs 130, and the column ADCs 130 act on each row in parallel, movement in the reference signal tends to cause row-wise effects (referred to herein as row-wise noise). Embodiments provide single-slope column-parallel ADC architectures that, among other things, address these row-wise noise sources. For example, some embodiments are described below with reference to FIGS. 4-7.

Figure 2:
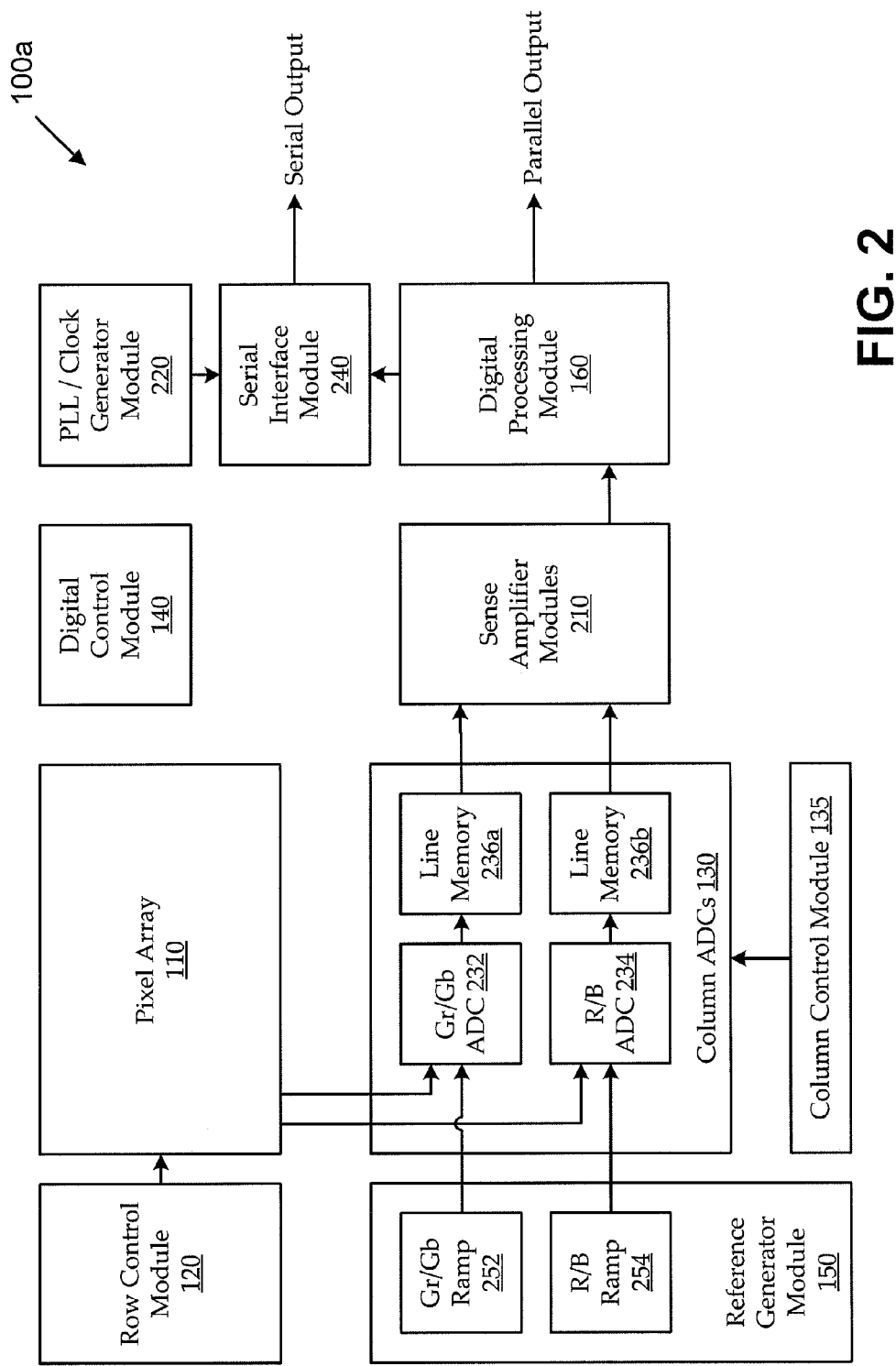
FIG. 2 shows a functional block diagram of an image processing system, which is an embodiment of the illustrative image processing system of FIG. 1.

FIG. 2 shows a functional block diagram of an image processing system 100a, which is an embodiment of the illustrative image processing system 100 of FIG. 1. Incident light is detected at the pixel array 110 and passed as analog signals in row-wise fashion, according to a row control module 120 (e.g., a row decoder), to a set of column ADCs 130. For the sake of illustration, the pixel array 110 is arranged according to a Bayer pattern, which may use 2-by-2 subarrays of pixels (not shown) as a color filter array including a red (R) pixel, a blue (B) pixel, and two green (Gr and Gb) pixels.

For example, active pixels in a 3264×2448 pixel array 110 are arranged in typical Bayer pattern format to produce 8-Megapixel resolution. Each column ADC 130 processes each pixel of the row-wise data in parallel with the other column ADCs 130 according to a column control module 135 (e.g., a column decoder). In the illustrated embodiment, the column ADCs 130 include Gr/Gb ADCs 232 for converting the green data, RB ADCs 234 for converting the red and blue data, and line memories 236 for facilitating the conversion and other pre-processing of the digital data at the column ADCs 130.

As described above, the conversion may involve comparison against a reference signal generated by a reference generator module 150. As illustrated, the reference signal may, in fact, be different for different color pixels. For example, pixels in the Bayer pattern may be compared against two reference signals, one for the green data generated by a Gr/Gb ramp 252, and another for the red and blue data generated by an R/B ramp 254. Use of multiple ramp signals may allow application of different amounts of gain or offset to different color data for each pixel, as the different reference signals may have different slopes, thereby causing different crossover points to be detected. In some embodiments, the reference generator module 150 is implemented as a switched-capacitor ramp generator. In other embodiments, the reference generator module 150 is implemented as a continuous-time integrator by integrating a programmable current into a capacitor with or without amplifier around the capacitor.

Data from the column ADCs 130 (e.g., from each line memory 236) is sent to one or more sense amplifier modules 210 by the column control module 135. The data may then be communicated from the sense amplifier modules 210 to the digital processing module 160 for further and/or final processing (e.g., image signal processing (ISP)). The final processed data may be output from the digital processing module 160 as a parallel digital output stream or through a serial interface module 240 (e.g., a 2-lane MIPI module) as a serial output stream.

According to some embodiments, some or all of the functional blocks of the image processing system 100a are controlled by a digital control module 140. The digital control module 140 may be implemented as a separate component or as part of the digital processing module 160. Embodiments of the digital control module 140 generate various clock signals, bias signals, reference signals, and/or other control signals that may be used by other blocks of the image processing system 100a to facilitate providing their respective functionality. The image processing system 100a is illustrated with additional functional blocks. For example, a phase-lock loop (PLL)/clock generator module 220 may be provided with an on-chip programmable PLL for synthesizing clocks for various blocks within the chip. In certain implementations, the reference generator module 150 includes charge pumps, bandgap, VDACs, IDACs, and/or other useful modules.

Figure 3:
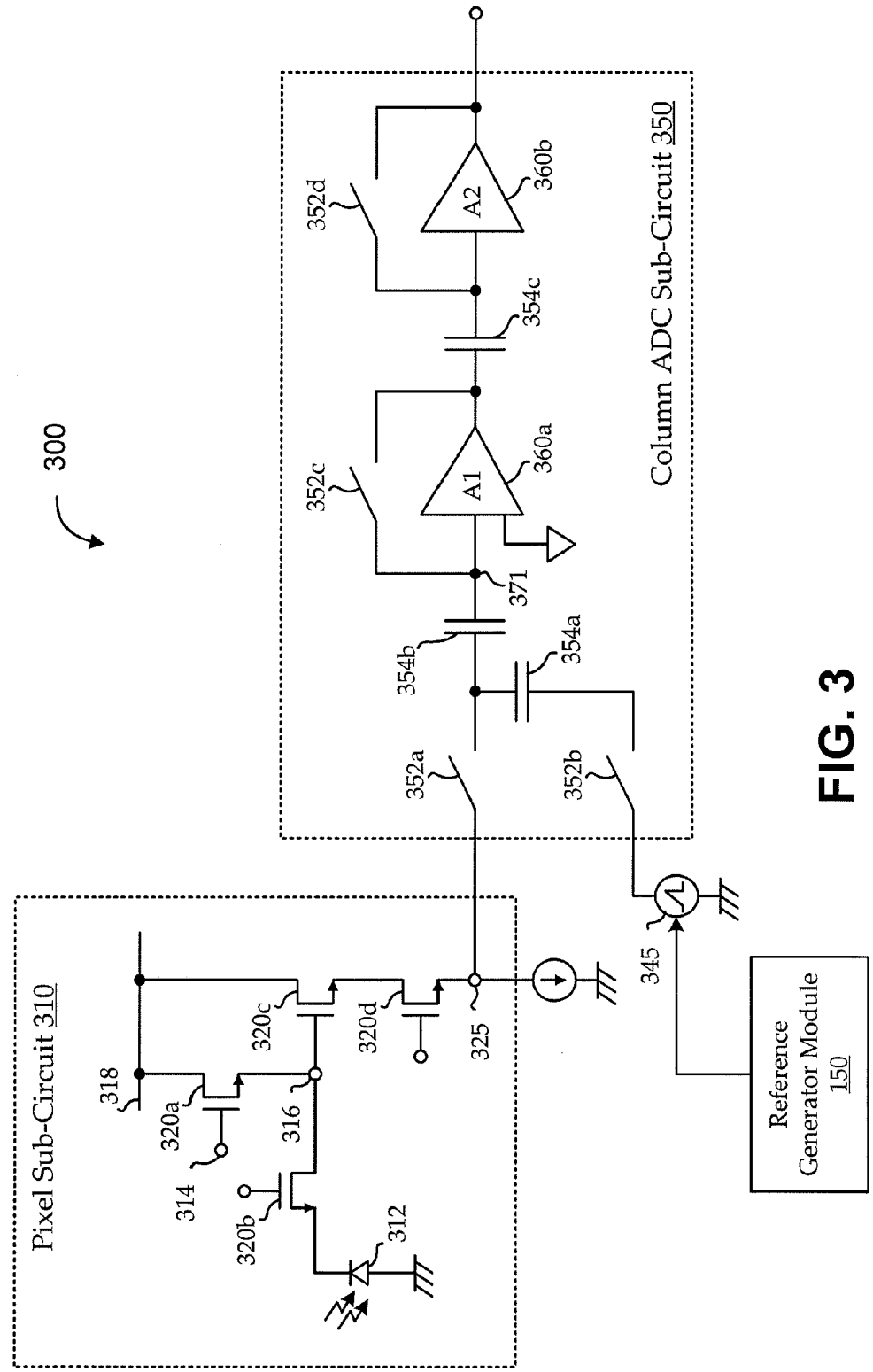
FIG. 3 shows a typical single-slope column-parallel ADC employing a single-ended architecture.

Notably, typical single-slope column-parallel ADCs employ single-ended architectures, for example, as illustrated by the circuit 300 shown in FIG. 3. The circuit 300 includes a pixel sub-circuit 310 and a column ADC sub-circuit 350. The pixel sub-circuit 310 may be implemented as part of an illustrative pixel, such as a pixel 115 of the pixel array 110 of FIG. 1. The column ADC sub-circuit 350 may be implemented as part of an illustrative column ADC 130 of FIG. 1.

As illustrated, the pixel sub-circuit 310 is shown as a "4T" architecture having a light sensor 312 (e.g., a photodiode) coupled with a four-transistor network. A reset signal 314 turns ON a reset transistor 320a (i.e., so that it is conducting), pulling intermediate node 316 to a reset pre-level according to a pixel source voltage ($V_{DD}$) 318. For example, the reset pre-level is defined by the pixel source voltage ($V_{DD}$) 318 minus any voltage drop across the reset transistor 320a. Using a source follower configuration (e.g., transistors 320c and 320d), the reset pre-level is passed from the intermediate node 316 (e.g., the floating diffusion (FD) node) to a pixel output node 325 as a reset level (e.g., which may typically differ from the reset pre-level due to effects of transistors 320c and 320d and/or other components of the pixel sub-circuit 310).

When the reset signal 314 turns ON reset transistor 320a, switch 352a of the column ADC sub-circuit 350 is also ON (i.e., conducting), causing the reset level at pixel output node 325 to effectively be sampled on capacitor 354b. In this reset operating state, switches 352c and 352d, each disposed in a feedback path of a comparator 360 stage, are ON (e.g., for offset storage). Notably, by sequentially turning OFF (e.g., opening) switches 352c and 352d, an offset introduced by the first stage comparator 360a is effectively cancelled and an input-referred offset of the overall structure is greatly reduced by comparator 360 gain stages (360a and 360b).

After the reset level has been set, an actual pixel signal level can be recorded. For example, reference transistor 320a is turned OFF and signal transistor 320b is turned ON to pass the signal generated by the light sensor 312 to the intermediate node 316. This signal can be communicated, through the source follower configuration of transistors 320c and 320d, from the intermediate node 316 to the pixel output node 325 and, thereby to the column ADC sub-circuit 350, as a pixel signal level.

The pixel signal level may typically be some voltage level below the previously recorded reference level, where a larger signal at the light sensor 312 is typically translated to a larger difference between the pixel reference level and the pixel signal level (i.e., a difference signal). This operation, known as correlated double sampling (CDS), may remove pixel reset noise and produce a difference signal between the pixel reset level and a subsequent pixel signal level at the input of the first stage comparator 360a. An upward ramp signal 345 (e.g., generated by the reference generator module 150) is applied through switch 352b, effectively compensating over some time for the difference signal at the input to comparator 360a. When the difference signal is fully compensated by the reference ramp signal 345 (i.e., when the input level at the comparator 360a returns to the reference level), the comparator 360a output changes polarity. By recording the point at which the change in polarity occurs, a digital code corresponding to the difference signal is detected.

It is worth noting that, while this approach is simple and effective, there are certain limitations to the approach as presented in FIG. 3. One such limitation is that the implementation may introduce gain error and column fixed pattern noise (CFPN) due to attenuation of the signal from the pixel output node 325 to the comparator input node 371. Another such limitation is that the single-ended circuit may be vulnerable to power supply noise, as discussed above. For example, row-wise noise coming from power supply variation during circuit operation could adversely impact image quality.

Figure 4:
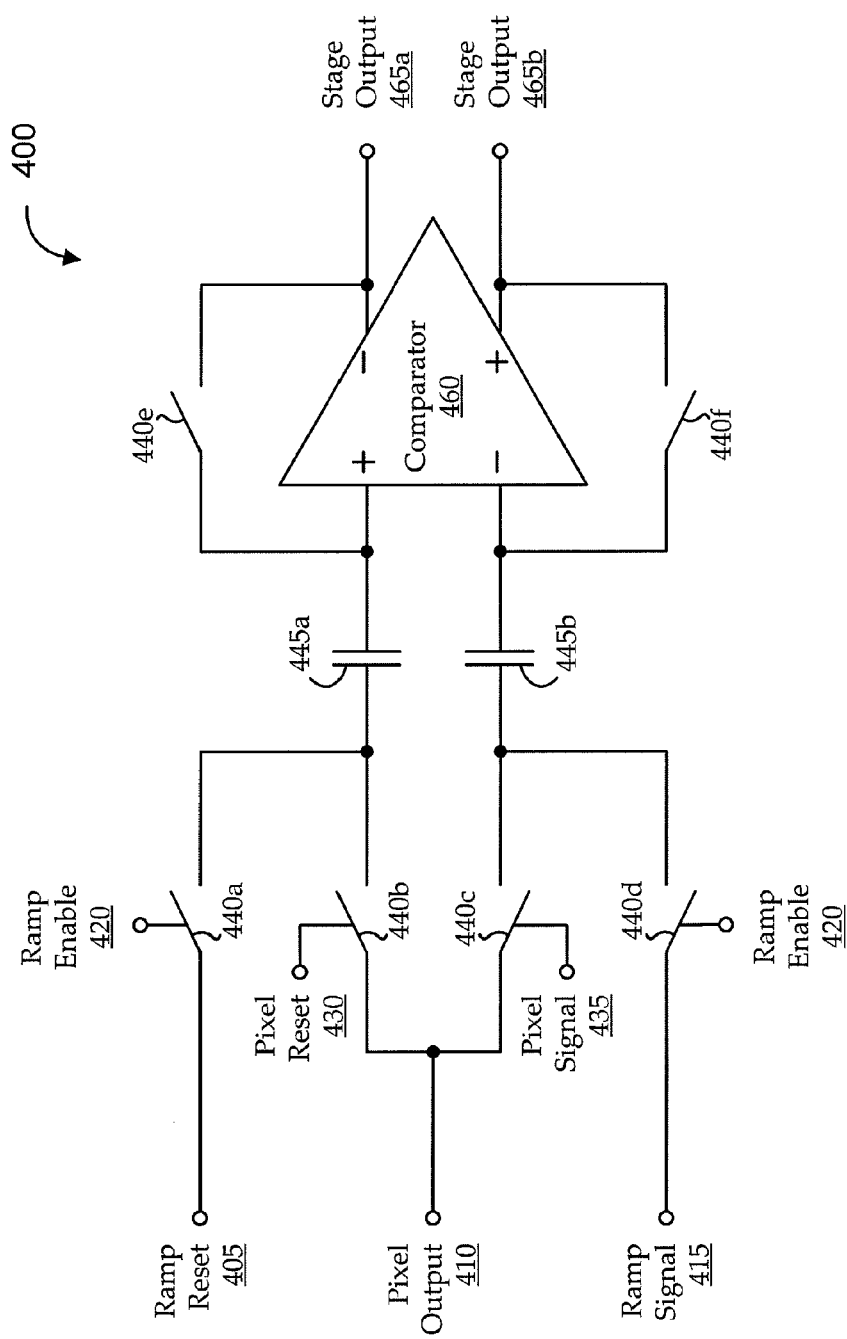
FIG. 4 shows a simplified circuit diagram for implementing a differentially driven column ADC architecture, according to various embodiments.

FIG. 4 shows a simplified circuit 400 diagram for implementing a differentially driven column ADC architecture, according to various embodiments. In some embodiments, the circuit 400 is used to implement functionality of the column ADCs 130 of FIG. 1 and/or 2. The circuit 400 receives two ramp signals and two pixel signals as input signals. A ramp generator (e.g., reference generator module 150 of FIG. 1) generates a ramp reset level 405 and a ramp signal level 415. A pixel (e.g., pixel sub-circuit 310 of FIG. 3) generates a pixel output level 410 (e.g., the level at pixel output node 325 of FIG. 3). As described above, during a first operating state, the pixel output level 410 represents a pixel reset level that is sampled onto capacitor 445a via switch 440b controlled by Pixel Reset control signal 430; and, during a second operating state, the pixel output level 410 represents a pixel signal level that is sampled onto capacitor 445b via switch 440c controlled by Pixel Signal control signal 435.

Each input of a comparator 460 is coupled with one of the ramp signals and one of the pixel signals. In particular, a positive input of the comparator 460 is coupled with the ramp reset level 405 and the pixel reset level 430. A negative input of the comparator 460 is coupled with the ramp signal level 415 and the pixel signal level 435. Each input of the comparator 460 is also configured for CDS operation with a sampling capacitor 445 and a feedback loop including a switch (i.e., 440e or 440f, respectively).

During a first operating state, the pixel reset control signal 430 is HIGH, causing switch 440b to be ON. A pixel reset level at pixel output 410 is sampled onto sampling capacitor 445a via switch 440b. During a second operating state, the pixel signal control signal 435 is HIGH, causing switch 440c to be ON. A pixel signal level at pixel output 410 is sampled onto capacitor 445b via switch 440c. During the first and second operating states, the comparator 460 may be in an auto-zero mode, so as to store any comparator 460 offset. During a third operating state, a ramp enable level 420 is used to start ramp operation. The ramp reset level 405 is applied to capacitor 445a via switch 440a, and the ramp signal level 415 is applied to capacitor 445b via switch 440d.

Thus, during the first and second operating states, respectively, the pixel reset and then the pixel signals, are differentially applied to sampling capacitor 445 while comparator 460 is in auto-zero mode. Then during the third operating state, the auto-zero is released and the ramp reset and ramp signals are differentially applied to the sampling capacitor 445 again. This initially causes the input voltage levels at the comparator 460 to move away from each other. For example, this causes the voltage level of negative input for the comparator 460 to move up. The ramp signal level 415 then ramps down while the holding ramp reset level 405 constant, so that the comparator inputs ultimately cross. When the input levels of the comparator 460 cross, the outputs 465 of the comparator 460 change polarity.

Figure 5:
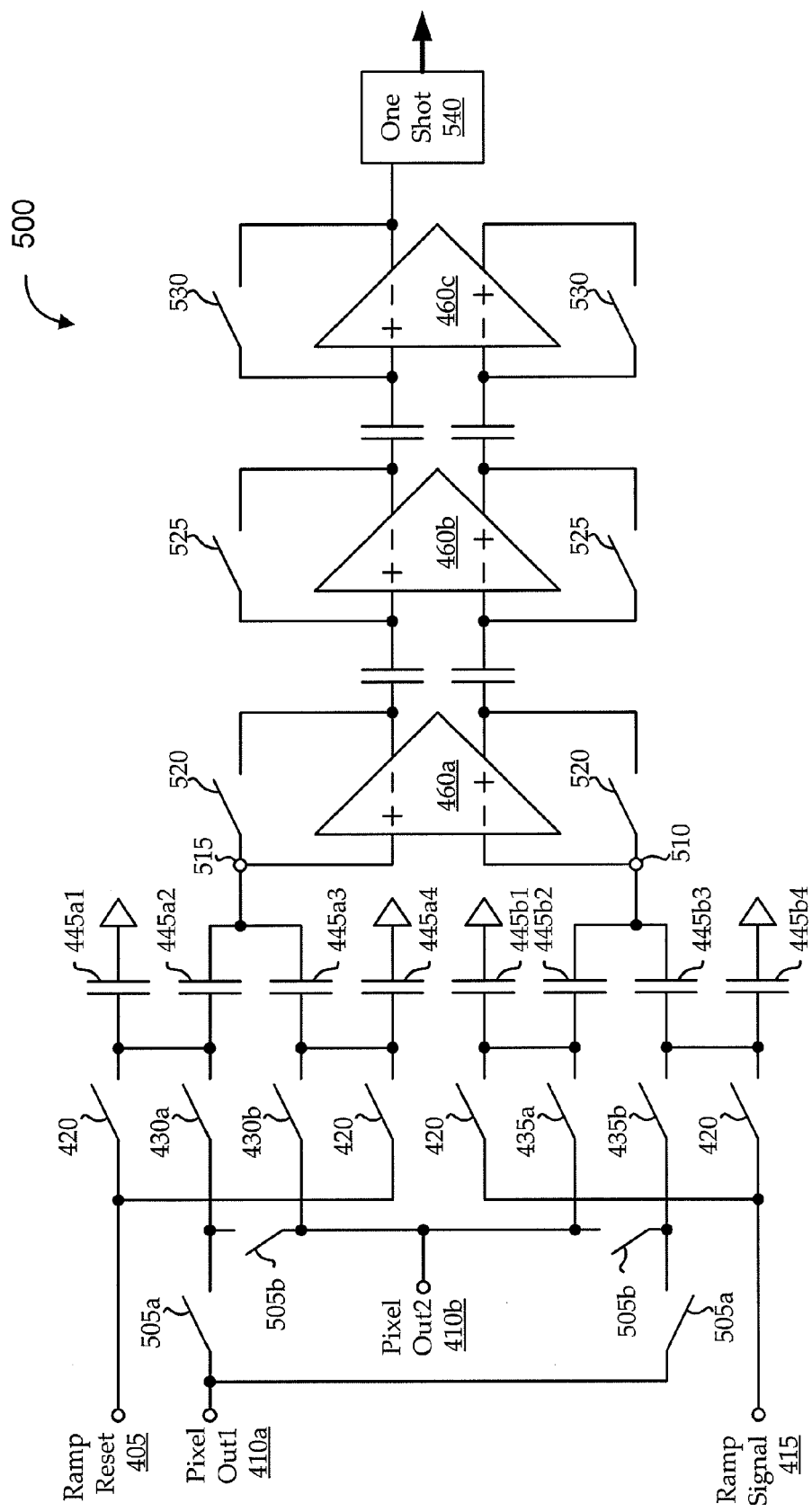
FIG. 5 shows a circuit diagram for an embodiment of a differentially driven column ADC architecture, like the circuit of FIG. 4 with added functionality.
Figure 6:
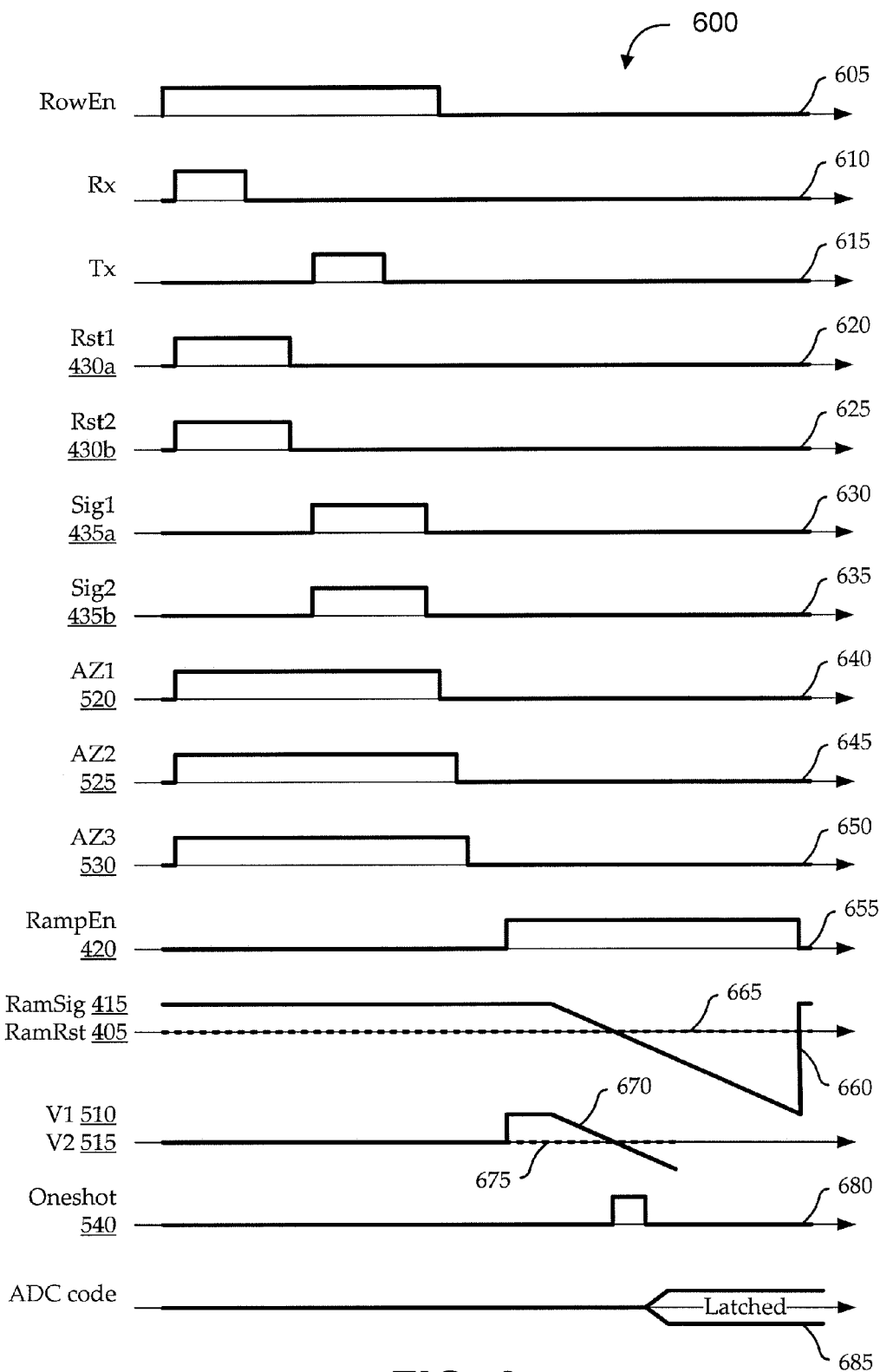
FIG. 6 shows an illustrative timing diagram for operation of the circuit of FIG. 5.

Notably, applying the ramp signals and the pixel signals differentially to the comparator 460 allows the circuit 400 to reject at least a portion of the power supply noise, thereby reducing row-wise variations. In some embodiments, additional features are included with a differential CDS architecture, like the one shown in the circuit 400 of FIG. 4. For example, FIG. 5 shows a circuit 500 diagram for an embodiment of a differentially driven column ADC architecture, like the circuit 400 of FIG. 4 with added functionality. In some embodiments, the circuit 400 is used to implement functionality of the column ADCs 130 of FIG. 1 and/or 2. FIG. 6 shows an illustrative timing diagram 600 for operation of the circuit 500 of FIG. 5. FIGS. 5 and 6 are described in parallel for added clarity.

As illustrated by a first waveform 605, a row enable signal is HIGH to select a row of pixel data. For example, as shown in FIG. 1, row control module 120 enables a row of pixels 115 of the pixel array 110. During a first operating state, a reset signal (Rx) is applied to the pixel to generate the pixel reset level, as illustrated by waveform 610 of FIG. 6. For example, as shown in FIG. 3, transistor 320a is enabled by an Rx signal at node 314, pulling intermediate node 316 to a reset pre-level, and pixel output node 325 to a pixel reset level. Pixel reset output is applied to the sampling capacitor 445 when pixel resets 430 are HIGH, as illustrated by waveforms 620 and 625 of FIG. 6, closing respective switches of FIG. 5 and sampling the pixel reset level (e.g., on sampling capacitors 445) at the positive input (V2) 515 of the first stage comparator 460a.

During a second operating state, a transmit signal (Tx) is applied to the pixel to generate the pixel signal level, as illustrated by waveform 615 of FIG. 6. For example, as shown in FIG. 3, transistor 320b is enabled by a Tx signal, pulling intermediate node 316 to a pixel signal pre-level, and pixel output node 325 to a pixel signal level. Pixel signal output is applied to the sampling capacitor 445 when pixel signals 435 are HIGH, as illustrated by waveforms 630 and 635 of FIG. 6, closing respective switches of FIG. 5 and sampling the pixel signal level (e.g., on sampling capacitors 445) at the negative input (V1) 510 of the first stage comparator 460a.

For example, as described above, pixel sub-circuit 310 of FIG. 3 generates pixel output level 410 as the level at pixel output node 325. Depending on whether Rx or Tx is HIGH (e.g., according to waveforms 610 and 615), the pixel output level 410 represents a pixel reset level or a pixel signal level. Also, during the first and second operating states, feedback loop switches 520, 525, and 530 are closed, creating feedback paths for their respective comparators 460a, 460b, and 460c. Enabling of these feedback loops is illustrated by waveforms 640, 645, and 650 of FIG. 6. As discussed above, this may place the comparators 460 in an auto-zero mode, so as to store any comparator 460 offset.

During a third operating state, a ramp enable signal (RampEn) 420 goes HIGH to start ramp operation, as illustrated by waveform 655 of FIG. 6. For example, reference generator module 150 of FIG. 1 generates a ramp reset level 405 and a ramp signal level 415. Alternately, the ramp reset level 405 may be a DC signal generated by any other component (e.g., and used as a reset level by the reference generator module 150). In some embodiments, the circuit 500 is configured so that the pixel reset level and the ramp reset level are substantially equal. After RampEn 420 goes HIGH, the ramp reset level 405 is held, while the ramp signal level 415 ramps down. As shown in FIG. 5, RampEn 420 also closes a number of respective switches, causing the ramp reset level 405 to be sampled on sampling capacitors associated with the positive input (V2) 515 of the first stage comparator 460a and the ramp signal level 415 to be sampled on sampling capacitors 445 associated with the negative input (V1) 510 of the first stage comparator 460a. In some embodiments, substantially when RampEn 420 goes HIGH, the feedback loop switches 520, 525, and 530 are opened, deactivating the feedback paths for comparators 460a, 460b, and 460c. Disabling of these feedback loops is illustrated by waveforms 640, 645, and 650 of FIG. 6. As discussed above, this may take the comparators 460 out of auto-zero mode.

Waveforms 660, 665, 670, and 675 illustrate values of the ramp signal level 415, the ramp reset level 405, V1 510 and V2 515, respectively. As the values of V1 510 and V2 515 change with respect to each other, the comparator 460 operates according to the difference between those values (i.e., differentially). When the level at V1 510 (i.e., the ramp signal level 415) drops below the level at V2 515 (i.e., the ramp reset level 405), the outputs of comparator 460a change polarity.

This change in polarity is propagated through two more comparator 460 stages (i.e., comparators 460b and 460c). For example, differential input CDS with three stages of differential comparators 460 may minimize comparator 460 offset. The change in polarity is ultimately detected by a one-shot module 540, which fires substantially at the crossover point, as illustrated by waveform 680 of FIG. 6. The firing timing of the one-shot module 540 may then be latched into ADC memory, as illustrated by waveform 685 of FIG. 6.

For example, a counter begins at some point during the ADC operation (e.g., when RampEn 420 goes HIGH) and ends at the crossover point when the one-shot module 540 fires. When the counter stops, the ending counter value is registered into a column memory by loading the memory with the ADC code (e.g., the counter value when the one-shot module 540 fires). For example, as shown in FIG. 2, the line memory 236 can be loaded with the ADC code, which can be sent to a digital block (digital processing module 160) via one or more sense amplifier modules 210.

It is worth noting some features of the circuit 500. As described above, the differential column CDS is used to differentially apply the ramp signals, ramp reset level 405 and ramp signal level 415, to the comparator 460 stages. One feature of this configuration is that offsets can be applied corresponding to different black levels by simply applying different ramp reset levels 405 to the circuit 500.

Another feature is that, by using the ramp signals and pixel signals differentially as described above, the comparator 460 tripping point may be kept the same across different pixel signal levels 435, while many typical architectures exhibit signal-dependent tripping points. This may allow reduced signal dependent nonlinearity in overall ADC performance.

Yet another feature is that the circuit 500 includes a number of additional signal paths and binning switches 505 to facilitate binning Switching the binning switches 505 may allow column binning to be achieved by sampling and averaging adjacent same colors to the differential comparator 460a. This may, for example, facilitate higher image quality at higher frame rate applications. Notably, implementing the binning functionality in the analog domain using the circuit 500 may allow application of different offsets for different color channels.

Figure 7:
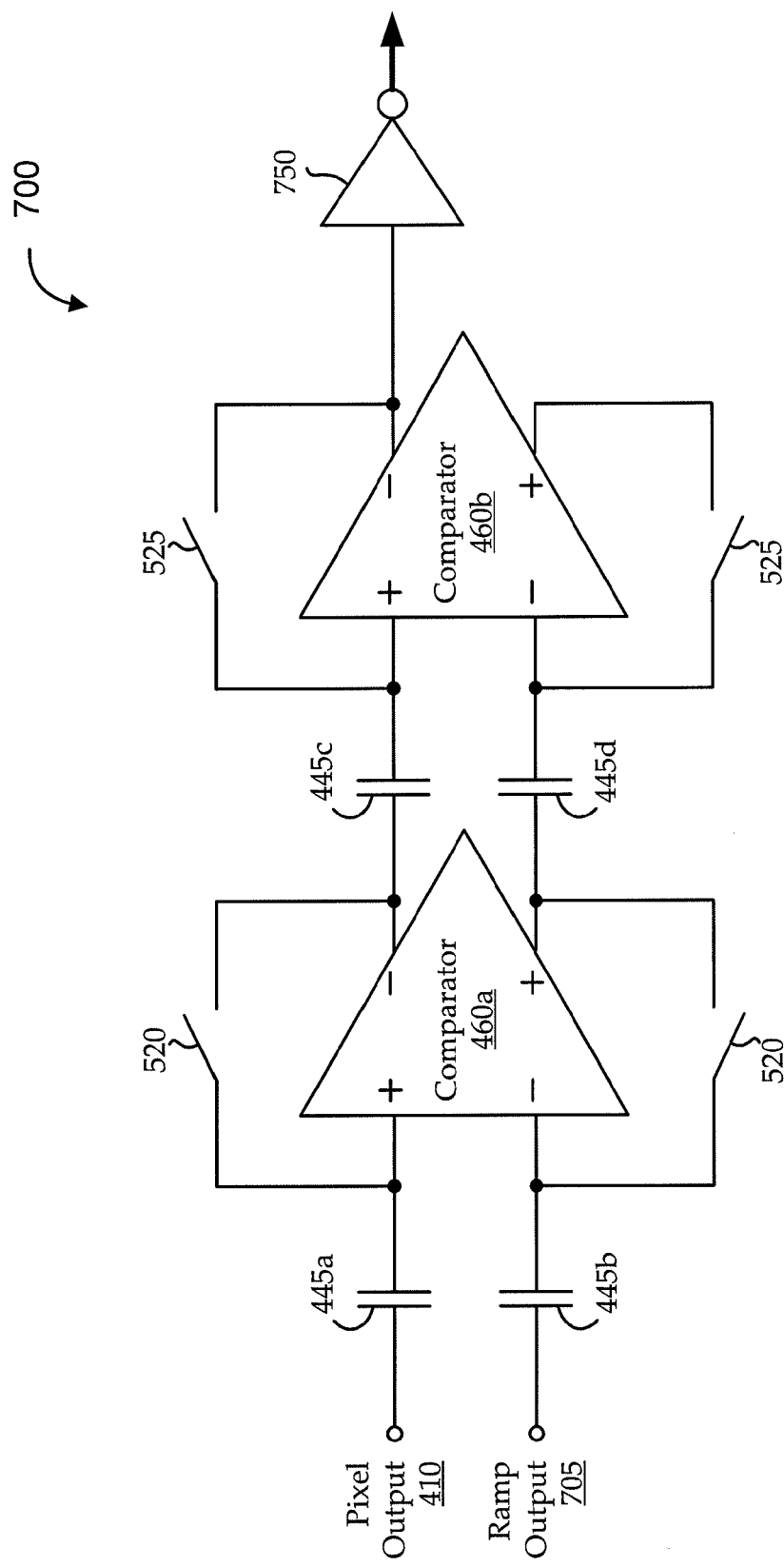
FIG. 7 shows a circuit diagram for an alternate embodiment of a differentially driven column ADC architecture, according to various embodiments.

Other topologies are also possible for implementing the differential-input column ADC functionality. FIG. 7 shows a circuit 700 diagram for an alternate embodiment of a differentially driven column ADC architecture, according to various embodiments. As in FIGS. 4 and 5, pixel output signals 410 and ramp output signals 705 are used to differentially drive multiple comparator 460 stages.

The pixel output signals 410 and ramp output signals 705 are sampled on sampling capacitors 445a and 445b, respectively, at the input of the first stage comparator 460a. The first stage comparator 460a and the second stage comparator 460b are capacitively coupled via capacitors 445c and 445d. The output of the second stage comparator 460b is passed to an output inverter 750. The output inverter 750 converts the second stage comparator 460b output to desired digital logic levels for use by other processing components (e.g., including for storage in one or more memories).

The circuit 700 of FIG. 7 may operate in a similar manner to the circuit 400 of FIG. 4. Notably, however, each architecture differentially drives the comparator 460 with a different arrangement of signals. As will be appreciated from the above description each of the pixel output signals 410 and the ramp output signals 705 includes two signals, a respective reset level and a respective signal level.

According to the circuit 400 of FIG. 4, each differential input of the comparator 460 receives one pixel output signal 410 and one ramp output signal 705. For example, the positive input receives both the pixel and ramp reset levels (i.e., at different times), while the negative input receives both the pixel and ramp signal levels (i.e., at different times). According to the circuit 700 of FIG. 7, each signal source (e.g., the pixel or the ramp reference generator) is tied to one of the differential inputs of the comparator 460. For example, the positive input receives both pixel output signals 410 (i.e., at different times), while the negative input receives both ramp output signals 705 (i.e., at different times).

It will be appreciated that each type of architecture provides features and limitations, and may be used in different embodiments for different purposes. For example, the circuit 400 of FIG. 4 may provide relatively higher rejection of power supply noise by receiving signals from both signal sources at both inputs, while the circuit 700 of FIG. 7 may simplify certain layout and/or other issues by coupling each signal source with only one of the comparator 460 inputs. Further, features of various embodiments described herein may be combined without departing from the scope of the disclosure or the claims. For example, various features of the architecture described in FIG. 5 (e.g., analog binning functionality) may be applied using known techniques to the architecture of the circuit 700 of FIG. 7.

The descriptions above include references to a number of components, including ADC and peripheral components. Illustrative embodiments of some of those components are illustrated in FIGS. 8-12. It will be appreciated that any components providing the described functionality can be used. As such, the particular embodiments shown in FIGS. 8-12 are intended to be illustrative only and should not be construed as limiting the scope of the description or the claims.

Figure 8:
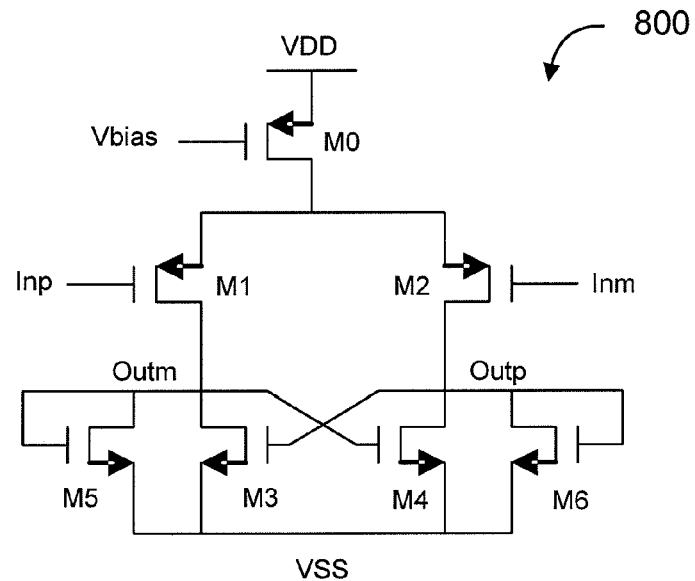
FIG. 8 shows an illustrative circuit of an embodiment of a comparator, like the first stage comparator of FIG. 5.

Turning to FIG. 8, an illustrative circuit 800 is shown of an embodiment of a comparator, like the first stage comparator 460a of FIG. 5. A standard analysis of this circuit 800 reveals that the comparator gain can be calculated as:

$$\frac{g_{m1}}{g_{m5} \cdot \left(1 - \frac{g_{m3}}{g_{m5}}\right)}.$$

According to this equation, components of the circuit 800 may be chosen to achieve a desired gain (e.g., typically around 10). The circuit 800 adds hysteresis to avoid having kick-back noises coming from adjacent columns (e.g., column ADCs 130 of FIG. 1) and/or the ramp generator (e.g., reference generator module 150) affect the comparator outcome once it has made a decision. In certain implementations, the transistors producing hysteresis (M3 and M4) may be omitted. In some embodiments, a second gain stage (e.g., comparator 460b of FIG. 5) uses substantially the same circuit 800, but with a smaller bias current. Further, in some embodiments, a third gain stage (e.g., comparator 460c of FIG. 5) uses a similar circuit 800, but with a differential to single-ended conversion architecture.

Figure 9:
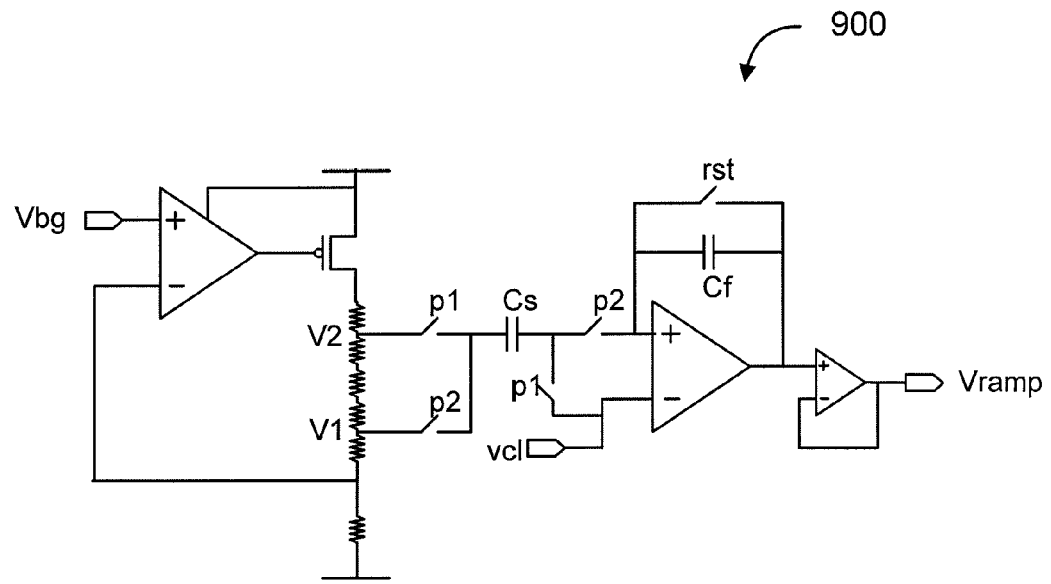
FIG. 9 shows an illustrative simplified circuit of an embodiment of a ramp generator, for example, as implemented by the reference generator module of FIG. 1, 2, or 3.

FIG. 9 shows an illustrative simplified circuit 900 of an embodiment of a ramp generator, for example, as implemented by the reference generator module 150 of FIG. 1, 2, or 3. A sampling capacitor (CS) of the integrator samples V1 and V2 at different clock phases. The difference between the two voltages is integrated on a feedback capacitor (CO at phase 2 of each clock cycle. The step of the ramp may be calculated as:

$$C_s/C_f(V_1-V_2).$$

One feature of this approach is that the step size and the resolution of the ramp can be easily changed by programming the capacitors and the difference voltage (V1–V2). In one embodiment, by considering the tradeoff between charge injection error and size requirement, CS is chosen to be 60 fF.

Figure 10:
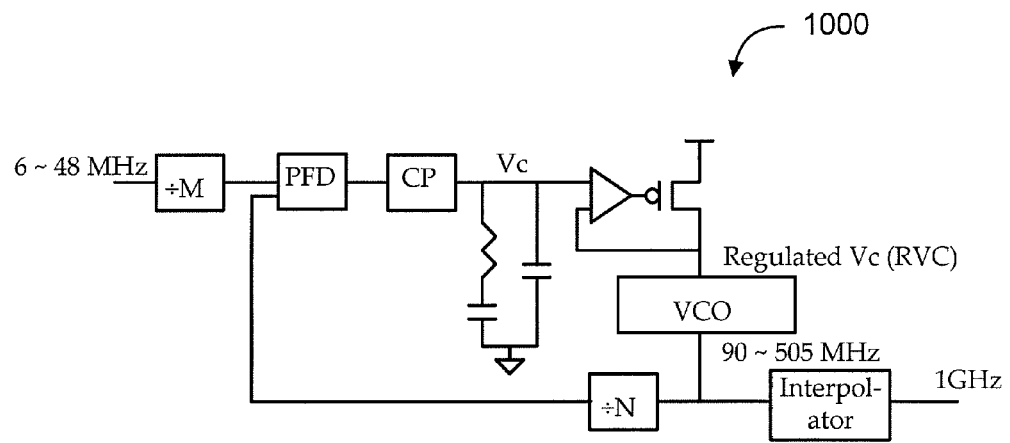
FIG. 10 shows an illustrative simplified circuit block diagram of an embodiment of a charge pump PLL, like the PLL/clock generator module of FIG. 2.
Figure 11:
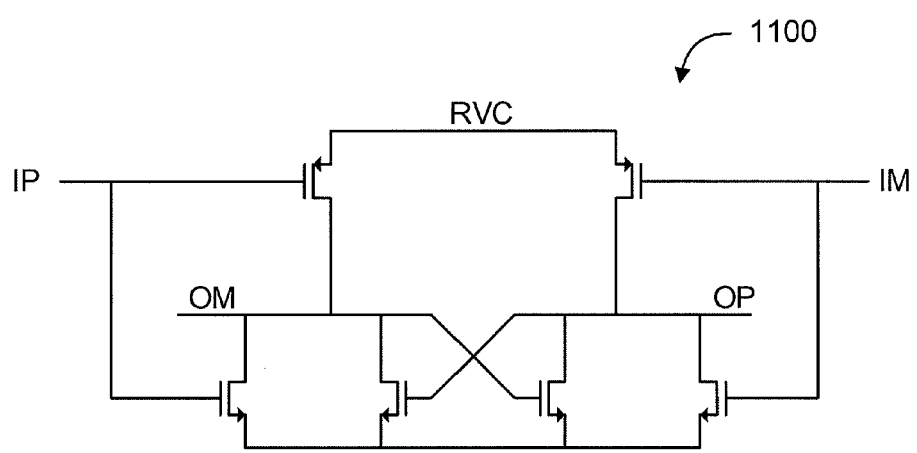
FIG. 11 shows an illustrative simplified circuit block diagram of an embodiment of a delay cell for use with the VCO in the charge pump PLL of FIG. 10.

FIG. 10 shows an illustrative simplified circuit block diagram 1000 of an embodiment of a charge pump PLL, like the PLL/clock generator module 220 of FIG. 2. The charge pump output is regulated before being applied to VCO. The VCO is a 4-stage differential ring oscillator with a delay cell. An illustrative simplified circuit 1100 of an embodiment of a delay cell for use with the charge pump PLL of FIG. 10 is shown in FIG. 11.

Figure 12:
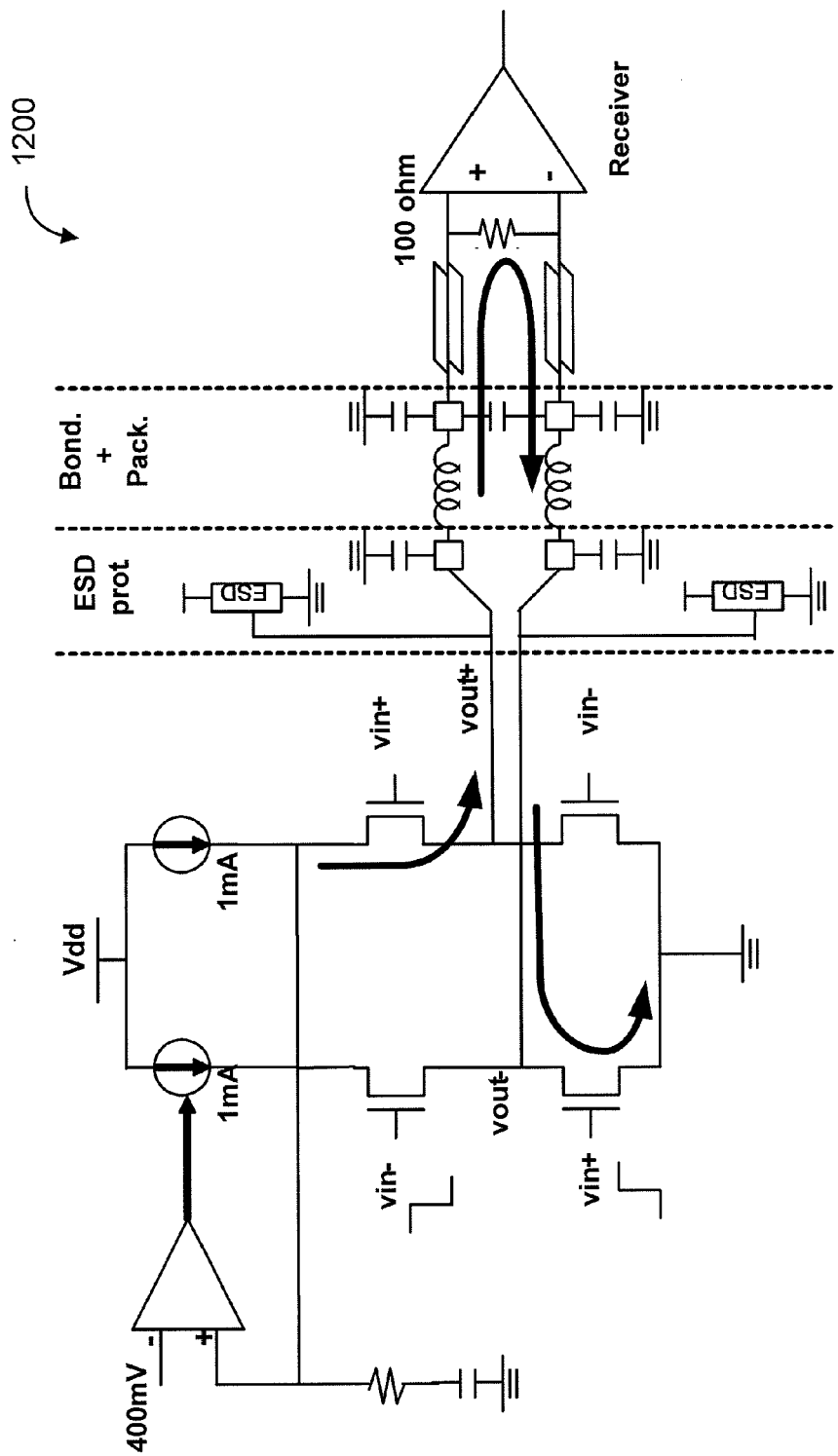
FIG. 12 shows an illustrative simplified circuit of an embodiment of a high-speed transmitter for use with the 2-lane MIPI module of FIG. 2.

FIG. 12 shows an illustrative simplified circuit 1200 of an embodiment of a high-speed transmitter for use with the 2-lane MIPI module 240 of FIG. 2. Embodiments of the 2-lane MIPI support full 15-fps image data output to the backend chip. As MIPI protocol dictates 8-bit parallel data into a serial bit stream regardless of ADC data bus size, multi-lane MIPI data may be formatted and sent to each lane of the PHY as 8-bit data. According to some embodiments, three stages of 2-to-1 MUX are used to produce a 1 Gbps serial data stream at the serializer output. Although the MIPI protocol goes through low power mode and high-speed mode alternatively, a high-speed transmitter may be more challenging (e.g., it may run at speeds close to 1 Gbps).

Embodiments of the circuit 1200 illustrate a high-speed transmitter for use in this context. According to the MIPI protocol, the differential signal swing should be 200 mV at the common-mode level of 200 mV. Embodiments use a programmable VDAC to set the voltage at the top of the H-bridge structure to be 400 mV. This may cause the common-mode level to be 200 mV. Notably, the signal swing depends on the ratio of transmitter resistance and the receiver termination resistance.

Figure 13:
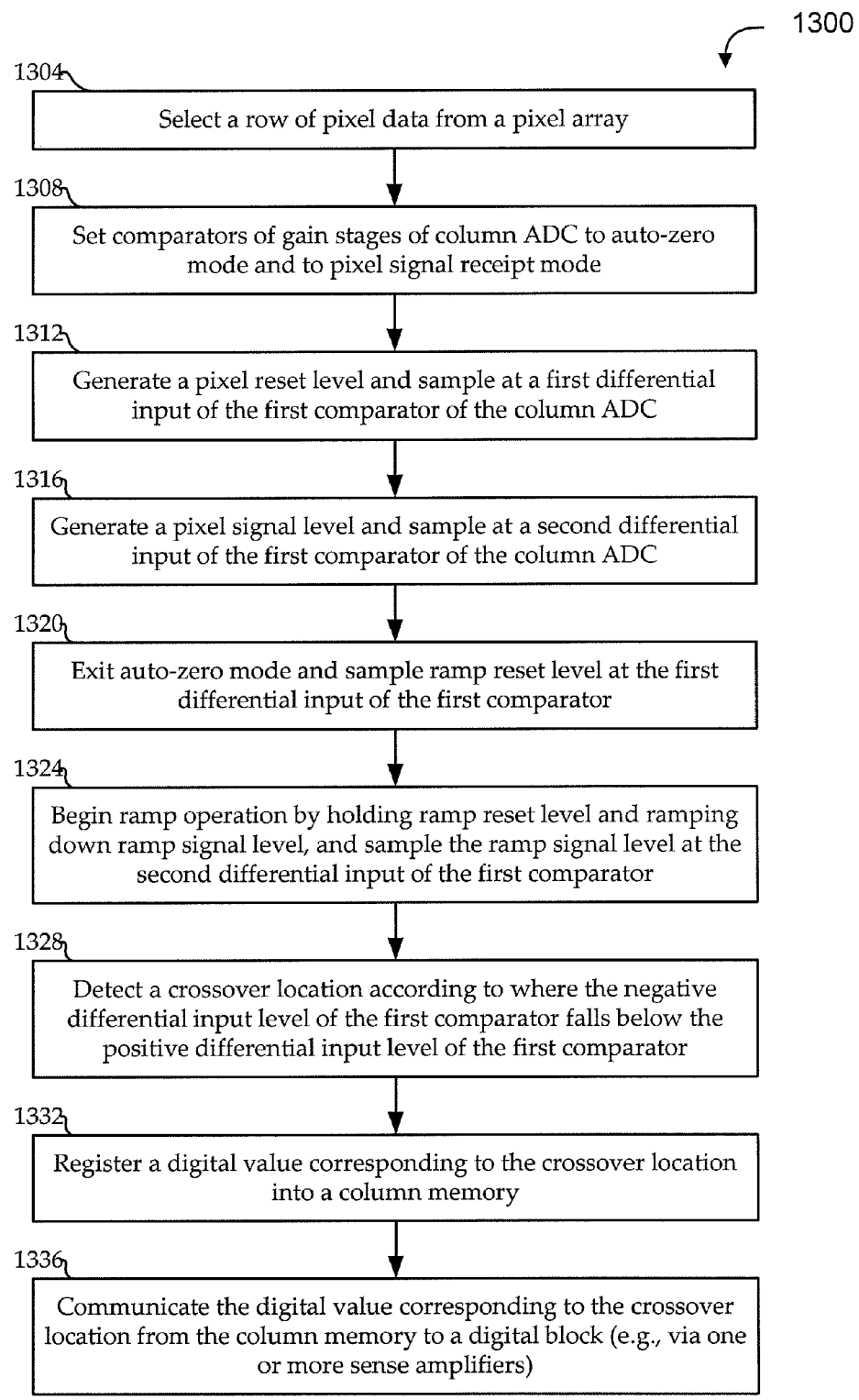
FIG. 13 shows a flow diagram of a method for implementing differential CDS using a column ADC in the context of a pixel array, according to various embodiments.

It will be appreciated that the system (e.g., system, device, component, etc.) embodiments discussed above, as well as additional embodiments, may be used to implement various method embodiments. FIG. 13 shows a flow diagram of a method 1300 for implementing differential CDS using a column ADC in the context of a pixel array, according to various embodiments. Embodiments of the method 1300 are implemented using a circuit like the circuit 500 of FIG. 5.

The method 1300 begins at block 1304 by selecting a row of pixel data from a pixel array. For example, row control module 120 of FIG. 1 outputs a row enable signal to select a row of pixels 115 from the pixel array 110. In some embodiments, at block 1308, comparators of gain stages of a column ADC are set to an auto-zero mode and to a pixel signal receipt mode. For example, feedback loop switches are closed, creating feedback paths for the respective comparators; and other switches are configured to deliver pixel signals to differential inputs of a first comparator, as described below.

At block 1312, a pixel reset level is generated and sampled at a first differential input of the first comparator of the column ADC. For example, a pixel reset signal is applied to a pixel circuit (e.g., pixel sub-circuit 310 of FIG. 3), driving the output of the pixel circuit to the pixel reset level. The pixel reset level is then sampled at the positive input of first stage comparator 460a of FIG. 5.

At block 1316, a pixel signal level is generated and sampled at a second differential input of the first comparator of the column ADC. For example, a pixel transmit signal is applied to the pixel circuit, driving the output of the pixel circuit to the pixel signal level. The pixel signal level is then sampled at the negative input of first stage comparator 460a of FIG. 5.

At block 1320, auto-zero mode is left and the ramp reset level is sampled at the first differential input of the first stage comparator 460a. In some embodiments, feedback loop switches are open, breaking feedback paths for the respective comparators to take the comparators out of auto-zero mode; and other switches are configured to deliver ramp signals (rather than pixel signals) to the differential inputs of the first comparator. At block 1324, ramp operation begins. As discussed with reference to FIG. 5, a ramp enable signal (RampEn) 420 goes HIGH to start ramp operation at block 1320, whereby a ramp reset level 405 is held while a ramp signal level 415 ramps down. Also, at block 1324, the ramp signal level is sampled at the negative input of the first stage comparator 460a.

At block 1328, a crossover location is detected according to where the negative differential input level of the first comparator 460a falls below the positive differential input level of the first comparator 460a. In some embodiments, the information propagates through multiple comparator stages, such that the crossover location is detected at another stage's output (e.g., an output of the third stage comparator 460c of FIG. 5). Notably, the crossover location may be where the differential input levels cross or at some other location.

For example, due to hysteresis and/or other effects, the location where the differential input levels cross may be different from a location where the output(s) of one or more comparators 460 change polarity, and the latter location may be used as the crossover location. In certain embodiments, a counter begins when the ramp enable signal 420 goes HIGH and ends when the comparator 460 polarity changes (e.g., as detected by a one-shot module 540 or other similar device). The ending counter value may then be used as the crossover location.

At block 1332, a digital value corresponding to the crossover location is registered into a column memory. The digital value corresponding to the crossover location may then be communicated from the column memory to a digital block at block 1336. For example, as shown in FIG. 2, when the counter stops, the ending counter value is registered into line memory 236 as ADC code. The ADC code is then sent to digital processing module 160 via one or more sense amplifier modules 210.

Figure 14:
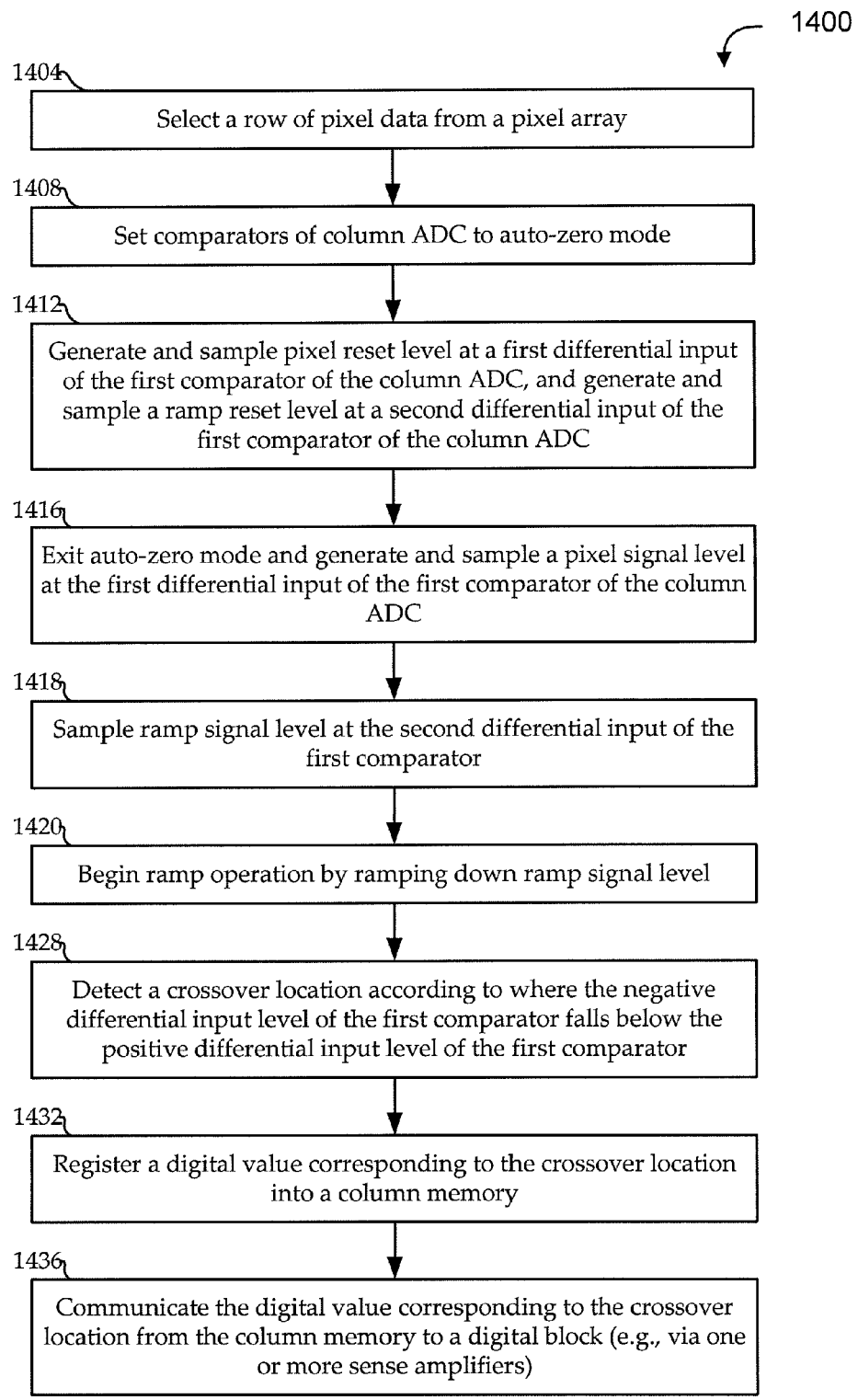
FIG. 14 shows a flow diagram of an alternate method for implementing differential CDS using a column ADC in the context of a pixel array, according to various embodiments.

FIG. 14 shows a flow diagram of an alternate method 1400 for implementing differential CDS using a column ADC in the context of a pixel array, according to various embodiments. Embodiments of the method 1400 are implemented using a circuit like the circuit 700 of FIG. 7. The method 1400 begins at block 1404 by selecting a row of pixel data from a pixel array. In some embodiments, at block 1408, comparators of gain stages of a column ADC are set to an auto-zero mode, for example, by enabling comparator feedback paths.

At block 1412, a pixel reset level is generated and sampled at a first differential input of the first comparator of the column ADC, and a ramp reset level is generated and sampled at a second differential input of the first comparator of the column ADC. At block 1416, a pixel signal level is generated and sampled at the first differential input of the first comparator of the column ADC. For example, a pixel circuit generates a pixel output level that is the pixel reset level at block 1412 and is the pixel signal level at block 1416. In some embodiments, feedback loop switches are open at or prior to block 1416, breaking feedback paths for the respective comparators to take the comparators out of auto-zero mode. At block 1418, the ramp signal level is sampled at the second differential input to the first comparator. At block 1420, ramp operation begins, whereby a ramp signal level ramps down. Typically, the ramp signal level ramps down from the ramp reset level.

Embodiments may then proceed substantially as described above with reference to FIG. 13. For example, at block 1428, a crossover location is detected. At block 1432, a digital value corresponding to the crossover location is registered into a column memory. The digital value corresponding to the crossover location may then be communicated from the column memory to a digital block at block 1436.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An image processing system comprising:
 a column analog-to-digital converter (ADC), electrically coupled with a pixel of an image sensor array, comprising:
  a gain stage comprising a first differential input node and a second differential input node, and configured to operate in an auto-zero mode or a non-auto-zero mode;
  a differential sampling subsystem, electrically coupled with the gain stage, and configured to:
   sample a pixel reset level at the first differential input node during a first operating state, the pixel reset level received from the pixel of the image sensor array;
   sample a pixel signal level at the second differential input node during a second operating state subsequent to the first operating state, the pixel signal level received from the pixel of the image sensor array;
   sample a ramp reset level at the first differential input node during a third operating state subsequent to the second operating state; and
   sample a ramp signal level at the second differential input node of the gain stage during the third operating state, the ramp signal level received from a ramp generator and changing over time according to a slope; and
  a crossover detection subsystem, electrically coupled with the differential sampling subsystem, and configured to:
   detect a crossover time at which at least one output of the gain stage changes polarity during the third operating state as the ramp signal level at the second differential input node changes while the ramp reset level at the first differential input node stays at a substantially constant level; and
   output a digital code corresponding to the crossover time.

2. The system of claim 1, the column ADC further comprising:
 a column memory, communicatively coupled with the crossover detection subsystem, and configured to store the digital code.

3. The system of claim 1, the crossover detection subsystem further comprising:
 a counter configured to start counting at a beginning of the third operating state, and to stop counting the counter at an ending counter value upon detecting the crossover time,
 wherein the digital code corresponds to the ending counter value.

4. The system of claim 1, further comprising:
 the image sensor array comprising a plurality of pixels, the pixel being one of the plurality of pixels, each pixel comprising a light sensor and an output node, the output node communicatively coupled with the first differential input node and the second differential input node of the gain stage, each pixel configured to:
  generate its pixel reset level by pulling the output node to a reference voltage level during the first operating state; and
  generate its pixel signal level by exposing its light sensor to a light level for a period of time to generate a voltage level corresponding to the light level and pulling the output node substantially to the voltage level corresponding to the light level during the second operating state.

5. The system of claim 1, further comprising:
 the image sensor array comprising a plurality of pixels, the pixel being one of the plurality of pixels, each pixel comprising:
  an output node communicatively coupled with the first differential input node and the second differential input node of the gain stage;
  a first transistor and a second transistor configured as a source follower to pass a level from an intermediate node substantially to the output node;
  a third transistor, electrically coupled with a reference node at the pixel reset level, and configured to pass the pixel reset level to the intermediate node;
  a light sensor configured to convert a light level to the pixel signal level; and
  a fourth transistor, electrically coupled with the light sensor, and configured to pass the pixel signal level to the intermediate node.

6. The system of claim 1, wherein the gain stage is configured to operate in the auto-zero mode during the first operating state and the second operating state, and to operate in the non-auto-zero mode during the third operating state.

7. The system of claim 1, wherein:
 the differential sampling subsystem comprises a first sampling capacitor coupled with the first differential input node and a second sampling capacitor coupled with the second differential input node; and
 the differential sampling subsystem is configured to:
  sample the pixel reset level and the ramp reset level on the first sampling capacitor during the first and third operating states, respectively; and
  sample the pixel signal level and the ramp signal level on the second sampling capacitor during the second and third operating states, respectively.

8. The system of claim 1, wherein the differential sampling subsystem is configured to interact with the gain stage to implement correlated double sampling (CDS).

9. The system of claim 1, wherein:
 the gain stage comprises a comparator;
 the first differential input node is a positive input node of the comparator; and
 the second differential input node is a negative input node of the comparator.

10. The system of claim 1, further comprising:
a switch network, communicatively coupled with the gain stage, and configured to implement analog binning.

11. The system of claim 1, wherein the gain stage is a first gain stage, and further comprising:
a second gain stage, an input of the second gain stage capacitively coupled with an output of the first gain stage and configured to have a smaller bias current than the first gain stage; and
a third gain stage, an input of the third gain stage capacitively coupled with an output of the second gain stage and configured according to a differential to single-ended conversion architecture.

12. A method comprising:
sampling a pixel reset level at a first differential input node of a gain stage of a column analog-to-digital converter (ADC) during a first operating state of the ADC, the pixel reset level received from a pixel of an image sensor array;
sampling a pixel signal level at a second differential input node of the gain stage during a second operating state of the ADC subsequent to the first operating state of the ADC, the pixel signal level received from the pixel of the image sensor array;
sampling a ramp reset level at the first differential input node of the gain stage during a third operating state of the ADC subsequent to the second operating state of the ADC;
sampling a ramp signal level at the second differential input node of the gain stage during the third operating state of the ADC, the ramp signal level received from a ramp generator and changing over time according to a slope;
detecting a crossover time at which at least one output of the gain stage changes polarity during the third operating state as the ramp signal level at the second differential input node changes while the ramp reset level at the first differential input node stays at a substantially constant level; and
outputting a digital code corresponding to the crossover time.

13. The method of claim 12, further comprising:
storing the digital code in a column memory associated with the column ADC.

14. The method of claim 12, further comprising:
communicating the digital code to a digital block for digital image signal processing.

15. The method of claim 12, further comprising:
starting a counter at a beginning of the third operating state of the ADC; and
stopping the counter at an ending counter value upon detecting the crossover time,
wherein outputting the digital code corresponding to the crossover location comprises outputting the ending counter value.

16. The method of claim 12, further comprising:
generating the pixel reset level using the pixel of the image sensor array by pulling an output node of the pixel to a reference voltage level during the first operating state of the ADC; and
generating the pixel signal level using the pixel of the image sensor array by exposing the pixel to a light level for a period of time to generate a voltage level corresponding to the light level and pulling the output node of the pixel substantially to the voltage level corresponding to the light level during the second operating state of the ADC,
the output node of the pixel electrically coupled with the first and second differential input nodes of the gain stage via a switch network.

17. The method of claim 12, further comprising:
operating the gain stage in an auto-zero mode during the first operating state and the second operating state; and
operating the gain stage in a non-auto-zero mode during the third operating state.

18. The method of claim 12, wherein:
the first differential input node of the gain stage is electrically coupled with a first sampling capacitor;
the second differential input node of the gain stage is electrically coupled with a second sampling capacitor;
sampling the pixel reset level at the first differential input node comprises sampling the pixel reset level on the first sampling capacitor;
sampling the pixel signal level at the second differential input node comprises sampling the pixel signal level on the second sampling capacitor;
sampling the ramp reset level at the first differential input node comprises sampling the ramp reset level on the first sampling capacitor; and
sampling the ramp signal level at the second differential input node comprises sampling the ramp signal level on the second sampling capacitor.

19. A system comprising:
means for sampling a pixel reset level at a first differential input node of a gain stage of a column analog-to-digital converter (ADC) during a first operating state of the ADC, the pixel reset level received from a pixel of an image sensor array;
means for sampling a pixel signal level at a second differential input node of the gain stage during a second operating state of the ADC subsequent to the first operating state of the ADC, the pixel signal level received from the pixel of the image sensor array;
means for sampling a ramp reset level at the first differential input node of the gain stage during a third operating state of the ADC subsequent to the second operating state of the ADC;
means for sampling a ramp signal level at the second differential input node of the gain stage during the third operating state of the ADC, the ramp signal level received from a ramp generator and changing over time according to a slope;
means for detecting a crossover time at which at least one output of the gain stage changes polarity during the third operating state as the ramp signal level at the second differential input node changes while the ramp reset level at the first differential input node stays at a substantially constant level; and
means for outputting a digital code corresponding to the crossover time.

* * * * *